(12) United States Patent
Lundgren et al.

(10) Patent No.: US 11,777,605 B2
(45) Date of Patent: Oct. 3, 2023

(54) INTERFERENCE CANCELLATION SYSTEM INCLUDING RADIO FREQUENCY (RF) DISPERSIVE DELAY FILTER AND RELATED METHODS

(71) Applicant: EAGLE TECHNOLOGY, LLC, Melbourne, FL (US)

(72) Inventors: Christin Lundgren, Palm Bay, FL (US); Richard DeSalvo, Satellite Beach, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 109 days.

(21) Appl. No.: 17/542,858

(22) Filed: Dec. 6, 2021

(65) Prior Publication Data
US 2023/0179301 A1 Jun. 8, 2023

(51) Int. Cl.
*H04B 10/2507* (2013.01)
*H04B 10/2575* (2013.01)

(52) U.S. Cl.
CPC ..... *H04B 10/2507* (2013.01); *H04B 10/2575* (2013.01)

(58) Field of Classification Search
None
See application file for complete search history.

(56) References Cited

U.S. PATENT DOCUMENTS

| | | | |
|---|---|---|---|
| 6,693,971 B1 | 2/2004 | Kowalski | |
| 8,897,607 B2 | 11/2014 | Desalvo | |
| 10,404,381 B1* | 9/2019 | Yap | H04B 10/2575 |
| 10,630,391 B1* | 4/2020 | LaGasse | H04B 10/50577 |
| 2019/0007140 A1 | 1/2019 | Jain | |
| 2019/0173503 A1 | 6/2019 | Kolodziej | |
| 2020/0112377 A1* | 4/2020 | Gianvittorio | H04B 1/525 |

OTHER PUBLICATIONS

Raos et al., Advanced OFDM-CDMA HF Modem with Self-Interference Cancellation; University of Spain/IEEE Military Communications Conference, 2003; MILCOM 2003, vol. 1, pp. 382-386.

(Continued)

*Primary Examiner* — David W Lambert
(74) *Attorney, Agent, or Firm* — ALLEN, DYER, DOPPELT, + GILCHRIST, P.A.

(57) ABSTRACT

An interference cancellation system may include a radio frequency (RF) transmitter configured to generate an RF interference signal, and an RF receiver configured to receive an RF input signal that includes a signal of interest component and an RF interference signal component from the RF transmitter. The system may also include an electro-optical (EO) modulator configured to apply an interference cancellation phase shift to the RF interference signal, an optical-to-electrical (OE) converter, and an optical path between the EO modulator and OE converter. The system may also include an RF dispersive delay filter connected to the OE converter, and an RF coupler connected to the RF dispersive delay filter and the RF receiver to subtract the RF interference signal component from the RF input signal thereby producing the signal of interest component.

22 Claims, 5 Drawing Sheets

(56) References Cited

OTHER PUBLICATIONS

Chen et al., Simultaneous Wideband Radio-Frequency Self-Interference Cancellation and Frequency Downconversion for In-band Full-duplex Radio-over-fiber Systems; Optics Letters, vol. 43, No. 13, Published Jul. 1, 2018; pp. 3124-3127.

Chang et al., An Integrated Optical Interference Cancellation System, Princeton University, Publication: 23rd Wireless and Optical Communication Conference, Newark, NJ 2014, pp. 1-5.

Chang et al., Integrated Microwave Photonic Circuit for Self-Interference Cancellation, Published in IEEE Transactions on Microwave Theory and Techniques, vol. 65, No. 11 dated Nov. 2017, pp. 4493-4501.

W. Zhou et al., Wideband Optical Multipath Interference Cancellation Based on a Dispersive Element published in IEEE Photonics Technology Letters, vol. 28, No. 8, dated Apr. 15, 2016, pp. 849-851.

\* cited by examiner

INTERFERENCE CANCELLATION SYSTEM INCLUDING RADIO FREQUENCY (RF) DISPERSIVE DELAY FILTER AND RELATED METHODS

TECHNICAL FIELD

The present invention relates to the field of electronics, and, more particularly, to interference cancellation and related methods.

BACKGROUND

Antenna-based communication systems cannot efficiently transmit and receive data on the same frequency (i.e., full duplex communication). For example, with respect to push-to-talk radio communications, to address this shortcoming, operations permit only one person to talk at a time. For example, with respect to cellular phones and many data communication systems, to address the above-noted shortcoming, two frequencies are generally used, one for the uplink (TX) and one for the downlink (RX). By using two frequencies, the amount of frequency spectrum for communications effectively doubles, which may be undesirable, particularly when spectral resources may be limited.

Self-interference cancellation (SIC) is a signal processing technique that enables a radio transceiver to simultaneously transmit and receive on a single channel, a pair of partially-overlapping channels, or any pair of channels in the same frequency band. In some cases, SIC may cut spectrum usage up to half. SIC may also enable systems that includes two or more radios that use the same frequency band to operate both radios simultaneously. SIC may also be employed to reduce interference, for example, from adjacent channels.

U.S. Pat. No. 10,404,381 to Yap is directed to receiver for an RF link that receives an RF signal and an interferer signal. The receiver includes an optical modulator, a photonic limiter coupled to the optical modulator, and a photonic decoder coupled to the photonic limiter. The optical modulator modulates an optical carrier with the RF signal and with the interferer and produces modulation sidebands associated with the RF signal and modulation sidebands associated with the interferer. The photonic limiter attenuates modulation sidebands associated with the interferer by a greater amount than the photonic limiter attenuates the modulation sidebands associated with the RF signal. The photonic decoder phase modulates the attenuated modulation sidebands associated with the interferer to spread energy of the attenuated modulation sidebands associated with the interferer over a first bandwidth, and phase modulates the attenuated modulation sidebands associated with the RF signal to spread energy of the attenuated modulation sidebands associated with the RF signal over a second bandwidth, wherein the second bandwidth is narrower than the first bandwidth.

Despite continuing development to provide more efficient use of radio spectrum, further developments are still desirable, particularly using interference cancellation approaches.

SUMMARY

An interference cancellation system may include a radio frequency (RF) transmitter configured to generate an RF interference signal, and an RF receiver configured to receive an RF input signal that includes a signal of interest component and an RF interference signal component from the RF transmitter. The system may also include an electro-optical (EO) modulator configured to apply an interference cancellation phase shift to the RF interference signal, an optical-to-electrical (OE) converter, and an optical path between the EO modulator and OE converter. The system may further include an RF dispersive delay filter connected to the OE converter, and an RF coupler connected to the RF dispersive delay filter and the RF receiver to subtract the RF interference signal component from the RF input signal thereby producing the signal of interest component.

The RF dispersive delay filter may include a substrate, an input and an output carried by the substrate, a conductive transmission line carried by the substrate between the input and output, and at least one delay feature coupled to the conductive transmission line, for example. The RF dispersive delay filter may include a ground plane carried by the substrate, and a dielectric layer carried by the ground plane carrying the conductive transmission line and the at least one delay feature.

The at least one delay feature may include a plurality of delay features coupled to the conductive transmission line on opposing sides thereof, for example. The at least one delay feature may have a loop shape, for example. The RF dispersive delay filter may include a plurality of conductive through-vias on opposing sides of the conductive transmission line.

The interference cancellation system may further include a controllable time delay unit coupled along the optical path, for example. The interference cancellation system may further include a controllable gain unit coupled along the optical path. The EO modulator may include a Mach-Zehnder modulator, for example.

A method aspect is directed to a method of interference cancellation. The method may include operating a radio frequency (RF) transmitter to generate an RF interference signal, and receiving, using an RF receiver, an RF input signal comprising a signal of interest component and an RF interference signal component from the RF transmitter. The method may further include applying, using an electro-optical (EO) modulator, an interference cancellation phase shift to the RF interference signal, and operating an optical-to-electrical (OE) converter. The method may also include operating an RF dispersive delay filter connected to the OE converter, and operating an RF coupler connected to the RF dispersive delay filter and the RF receiver to subtract the RF interference signal component from the RF input signal thereby producing the signal of interest component.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
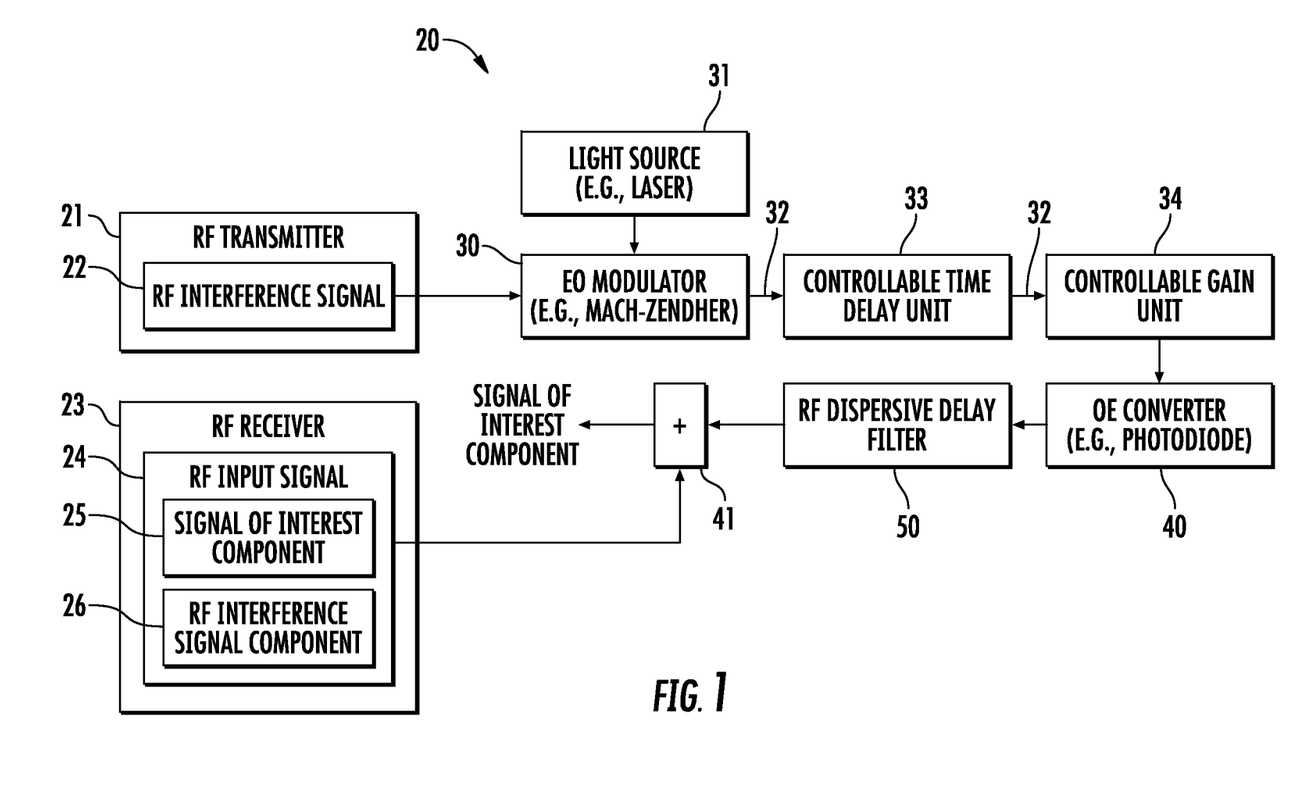
FIG. 1 is a schematic diagram of an interference cancellation system in accordance with an embodiment.

Referring initially to FIG. 1, an interference cancellation system 20 includes a radio frequency (RF) transmitter 21 configured to generate an RF interference signal 22. The interference signal 22 may be interference from an adjacent RF transmitter, such as, for example, that may intentionally operate as an interferer. Alternatively, the interference signal may be a communications signal operating in the same frequency range as the RF receiver 23 as will be appreciated by those skilled in the art. The RF receiver 23 receives an RF input signal 24 that includes a signal of interest component 25, and an RF interference signal component 26 from the RF transmitter 21.

The interference cancellation system 20 also includes an electro-optical (EO) modulator 30. The EO modulator 30 may be a Mach-Zehnder modulator (MZM), for example. The EO modulator 30 applies an interference cancellation phase shift to the RF interference signal 22. More particularly, the EO modulator 30 biases modulation in quadrature at the fifty-percent point. Thus, a "negative copy" of the RF interference signal 22 such that the RF interference signal is 180-degrees out of phase.

An optical source 31 is coupled to the EO modulator 30. The optical source 31 may be a laser, for example, a single-mode C-band laser that operates in the 1550 nm range. Of course, the optical source 31 may be another type of optical source, for example, another type of laser.

The interference cancellation system 20 also includes an optical-to-electrical (OE) converter 40. The OE 40 converter may be a photodiode, for example. The OE converter 40 may be another type of OE converter.

An optical path 32 is between the EO modulator 30 and OE converter 40. A controllable time delay unit 33 is coupled along an optical path 32, and more particularly coupled to the output of the EO modulator 30. The controllable time delay unit 33 may operate in the optical domain and selectively include various lengths of the optical fiber to provide the desired delay.

A controllable gain unit 34 is also coupled along the optical path 32. More particularly, the controllable gain unit 34 is coupled between the controllable time delay unit 33 and the OE converter 40. Those skilled in the art will appreciate that through the use of the controllable time delay unit 33 and the controllable gain unit 34, the out of phase RF interference signal 22 may be realigned.

Figure 2:
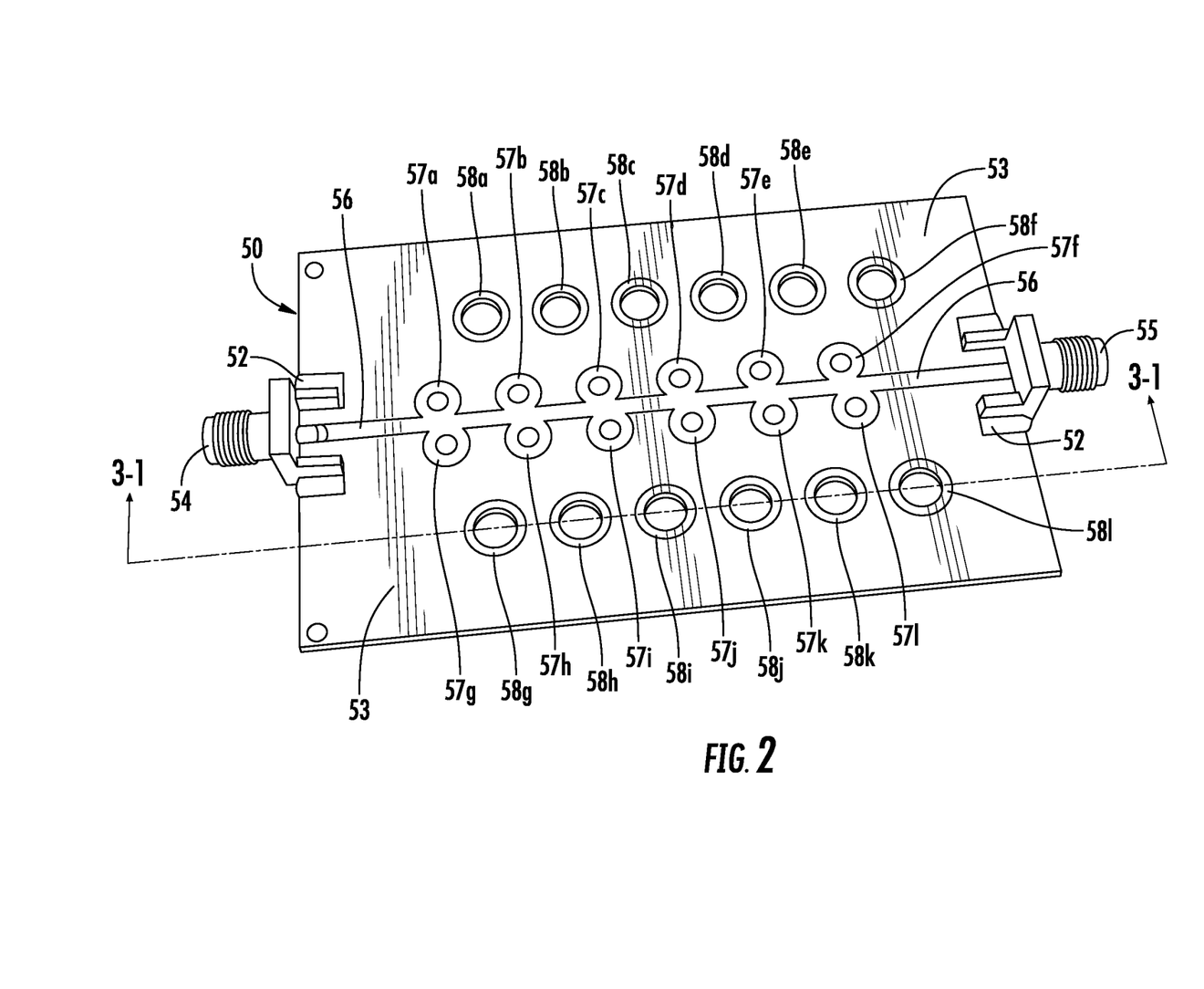
FIG. 2 is a perspective view of an exemplary RF dispersive delay filter for use with the interference cancellation system of FIG. 1.
Figure 3:
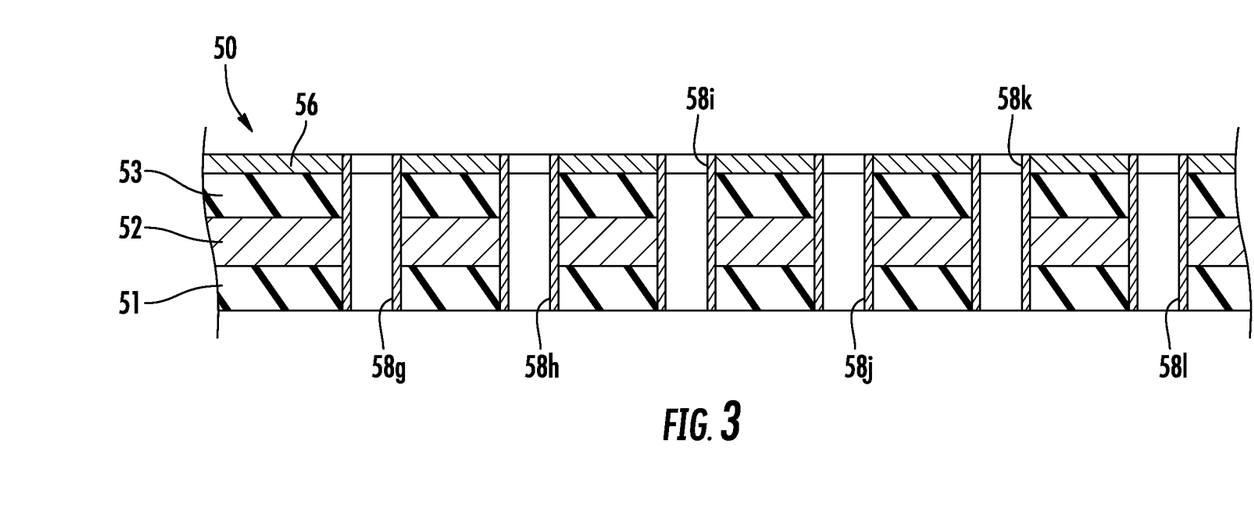
FIG. 3 is a schematic cross-sectional view of a portion of the RF dispersive delay filter of FIG. 2 taken along line 3-1.

Referring additionally to FIGS. 2 and 3, an RF dispersive delay filter 50 is connected to the OE converter 40. The RF dispersive delay filter 50 includes an optional substrate 51 (e.g., a dielectric substrate). A ground plane 52 is carried by the substrate 51. A dielectric layer 53 is carried by the ground plane 52.

An input 54 and an output 55 are carried by the substrate. The input 54 and the output 55 illustratively include or are in the form of connectors, such as, example, sub-miniature version A (SMA) connectors coupled to exposed adjacent portions of the ground plane 52 and coupled to respective opposing ends of a conductive transmission line 56 carried by the dielectric layer 53. Of course, the input 54 and output 55 may include or be in the form of different connectors, for example.

The conductive transmission line 56 is carried by the substrate 51 between the input 54 and the output 55. Delay features 57a-57l are coupled to the conductive transmission line 56. The delay features 57a-57l each illustratively have a circular loop shape, are conductive, and are carried by the dielectric layer 53. Each delay feature 57a-57l is coupled in a tangential relationship to the conductive transmission line 56. The delay features 57a-57l are illustratively configured in pairs, slightly longitudinally offset along and on opposite sides of the conductive transmission line 56. As will be appreciated by those skilled in the art, the width and the thickness of the conductive transmission line 56 along with the amount, shape, size, and location of the delay features 57a-57l (i.e., the geographic relationship to the ground plane 52) define the operating frequency delay characteristics of the RF dispersive delay filter 50. While twelve delay features 57a-57l are illustrated, it should be appreciated that there may be other numbers of delay features. Moreover, while the delay features 57a-57l are illustratively the same size and shape, the delay features may have different shapes and sizes.

The RF dispersive delay filter 50 also includes conductive through-vias 58a-58l, for example, plated through-vias, aligned on opposite sides of the conductive transmission line 56 and extending through the ground plane 52. The through-vias 58a-58l cooperate with the ground plane 52 and transmission line 56 to provide a desired RF performance.

An RF coupler 41 is connected to the RF dispersive delay filter 50 and the RF receiver 23 to subtract the RF interference signal component 26 from the RF input signal 24 thereby producing the signal of interest component 25.

Figure 4:
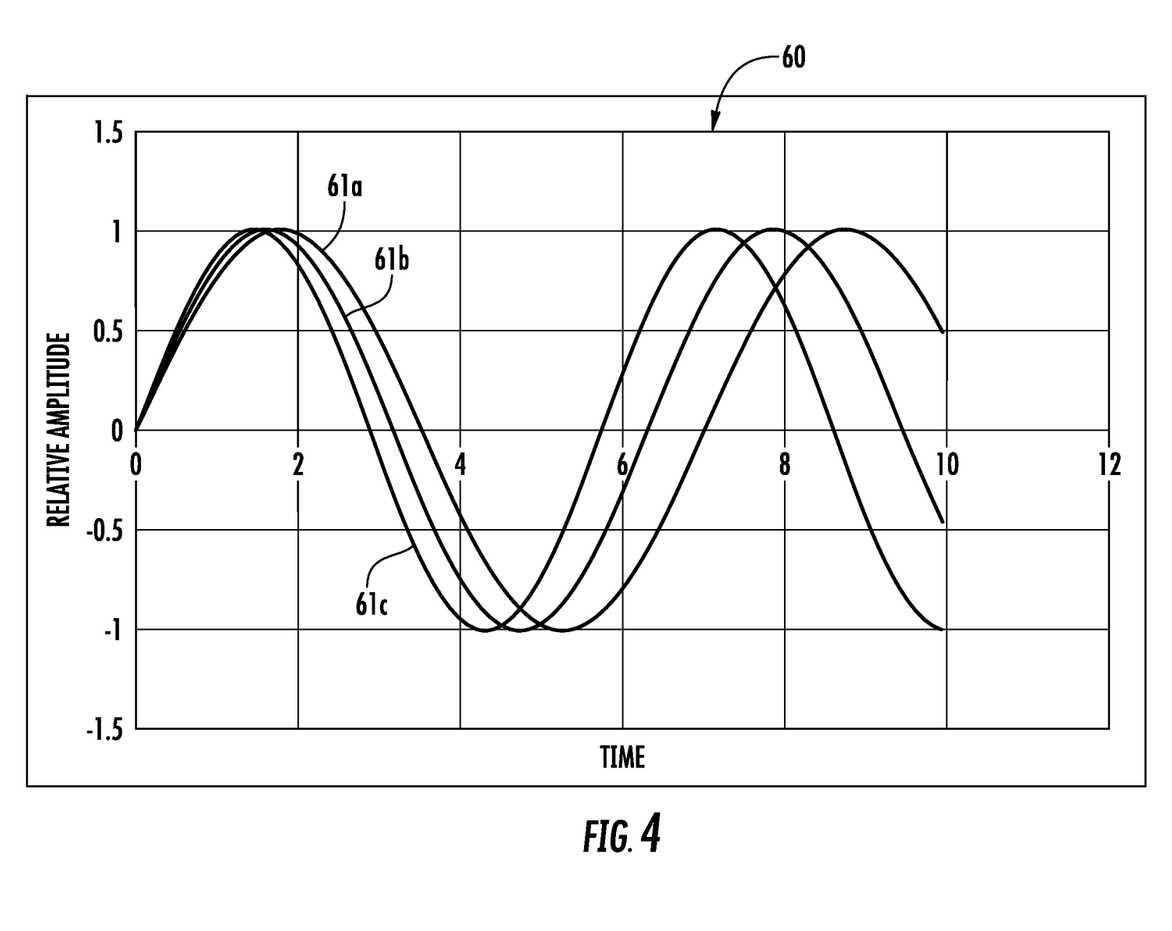
FIG. 4 is a graph illustrating dispersion resulting from signal delay.

Referring briefly to the graph 60 in FIG. 4, which illustrates dispersion resulting from signal delay based upon exemplary data, those skilled in the art will appreciate that without the RF dispersive delay filter 50, the RF signals may be classified as just ultra-narrow band, for example. Signals output from controllable time delay unit 33 are dispersed and have a spread in frequency. Because of different frequencies and because of the dispersion or spread in frequency, without the RF dispersive delay filter 50, only a single one of the sine curves 61a-61c may be cancelled. In other words, while the controllable time delay unit 33 provides a delay, that delay is valid at one frequency due to inexact path matching. Other frequencies are delayed more or less than the center frequency, resulting in reduced cancellation depth.

Figure 5:
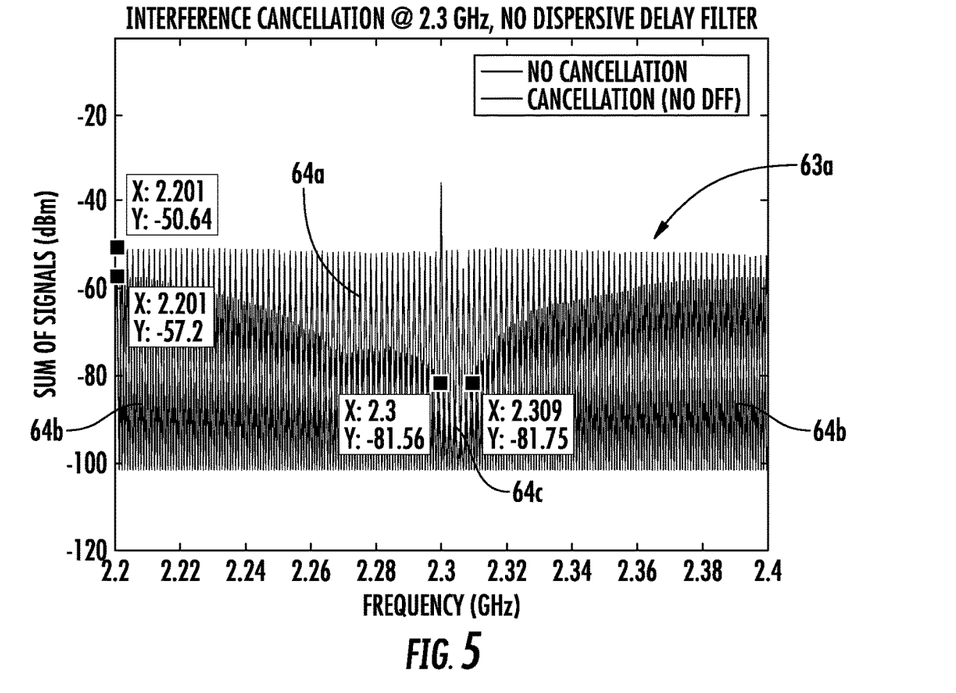
FIG. 5 is a graph illustrating interference cancellation in an interference cancellation system without an RF dispersive delay filter in accordance with the prior art.

Referring now to the graph 63a in FIG. 5, measured interference cancellation at 2.3 GHz without the RF dispersive delay filter 50 is illustrated using a test system. The lines 64a illustrate the sum of signals without (i.e., signal of interest component 25 and RF interference signal component 26) cancellation, while the lines 64b illustrate the sum of signals with cancellation. Illustratively, without the RF dispersive delay filter 50, 9 MHz of 30 dB bandwidth is provided with 7 dB of cancellation over 200 MHz 64c.

Figure 6:
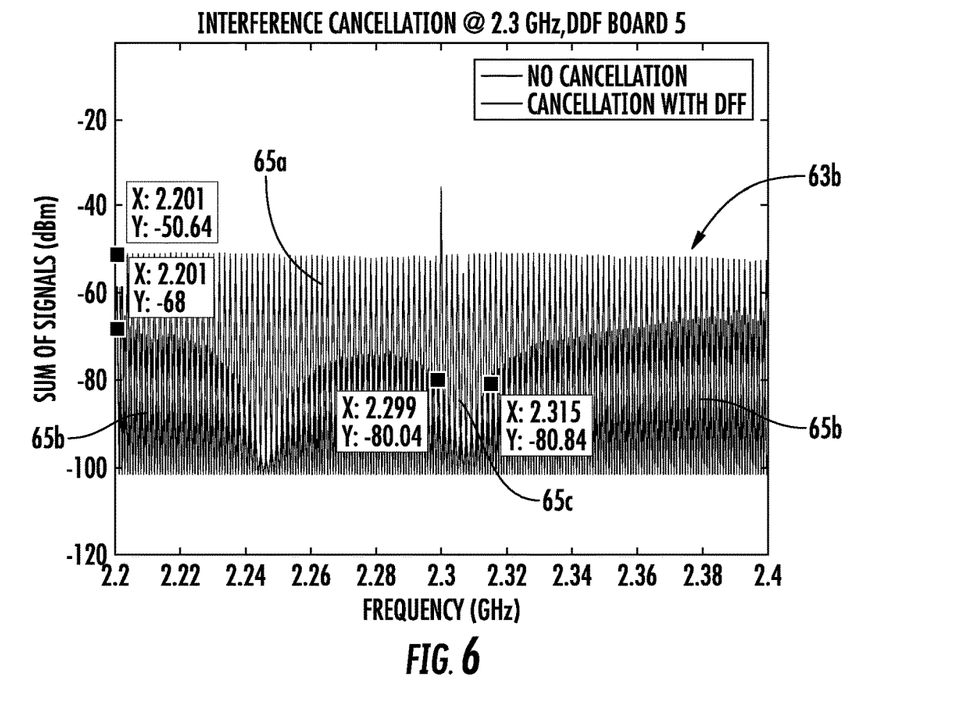
FIG. 6 is a graph illustrating interference cancellation in an interference cancellation system including an RF dispersive delay filter in accordance with an embodiment.

Referring to the graph 63b in FIG. 6, measured interference cancellation at 2.3 GHz with the RF dispersive delay filter 50 is illustrated using the test system. The lines 65a illustrate the sum of signals without (i.e., signal of interest component 25 and RF interference signal component 26) cancellation, while the lines 65b illustrate the sum of signals with cancellation. Illustratively, with the RF dispersive delay filter 50, 16 MHz of 30 dB bandwidth is provided with 17 dB of cancellation over 200 MHz 65c. Accordingly, the interference cancellation system 20 including the RF dispersive delay filter 50 may advantageously provide increased interference cancellation, for example, across a relatively wide band. Those skilled in the art will appreciate that the interference cancellation system 20 including the RF dispersive delay filter 50 may be considered frequency and waveform agnostic as it may operate at frequencies of up to 40 GHz, for example.

Moreover, as will be appreciated by those skilled in the art, the RF dispersive delay filter 50 may be configured to have a small amount of RF dispersion to compensate for any small mismatch in path length for different wavelengths. Path mismatch creates length-based dispersed signals that are not perfectly cancelled except at a single frequency, limiting the possible cancellation bandwidth. The combination of the broadband nature of photonics and the RF dispersive delay filter 50 is an advantageous feature of the system 20.

A method aspect is directed to a method of interference cancellation. The method includes operating a radio frequency (RF) transmitter 21 to generate an RF interference signal 22, and receiving, using an RF receiver 23, an RF input signal 24 that includes a signal of interest component 25 and an RF interference signal component 26 from the RF transmitter. The method may further include applying, using an electro-optical (EO) modulator 30, an interference cancellation phase shift to the RF interference signal 22, and operating an optical-to-electrical (OE) converter 40. The method may also include operating an RF dispersive delay filter 50 connected to the OE converter 40, and operating an RF coupler 41 connected to the RF dispersive delay filter and the RF receiver 23 to subtract the RF interference signal component 26 from the RF input signal 24 thereby producing the signal of interest component 25.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An interference cancellation system comprising:
   a radio frequency (RF) transmitter configured to generate an RF interference signal;
   an RF receiver configured to receive an RF input signal comprising a signal of interest component and an RF interference signal component from the RF transmitter;
   an electro-optical (EO) modulator configured to apply an interference cancellation phase shift to the RF interference signal;
   an optical-to-electrical (OE) converter;
   an optical path between the EO modulator and OE converter;
   an RF dispersive delay filter connected to the OE converter; and
   an RF coupler connected to the RF dispersive delay filter and the RF receiver to subtract the RF interference signal component from the RF input signal thereby producing the signal of interest component.

2. The interference cancellation system of claim 1 wherein the RF dispersive delay filter comprises:
   a substrate;
   an input and an output carried by the substrate;
   a conductive transmission line carried by the substrate between the input and output; and
   at least one delay feature coupled to the conductive transmission line.

3. The interference cancellation system of claim 2 wherein the RF dispersive delay filter comprises:
   a ground plane carried by the substrate; and
   a dielectric layer carried by the ground plane carrying the conductive transmission line and the at least one delay feature.

4. The interference cancellation system of claim 2 wherein the at least one delay feature comprises a plurality of delay features coupled to the conductive transmission line on opposing sides thereof.

5. The interference cancellation system of claim 2 wherein the at least one delay feature has a loop shape.

6. The interference cancellation system of claim 2 wherein the RF dispersive delay filter comprises a plurality of conductive through-vias on opposing sides of the conductive transmission line.

7. The interference cancellation system of claim 1 further comprising a controllable time delay unit coupled along the optical path.

8. The interference cancellation system of claim 1 further comprising a controllable gain unit coupled along the optical path.

9. The interference cancellation system of claim 1 wherein the EO modulator comprises a Mach-Zehnder modulator.

10. An interference cancellation system comprising:
    a radio frequency (RF) transmitter configured to generate an RF interference signal;
    an RF receiver configured to receive an RF input signal comprising a signal of interest component and an RF interference signal component from the RF transmitter;
    an electro-optical (EO) modulator configured to apply an interference cancellation phase shift to the RF interference signal;
    an optical-to-electrical (OE) converter;
    an optical path between the EO modulator and OE converter;
    a controllable time delay unit coupled along the optical path;
    an RF dispersive delay filter connected to the OE converter and comprising
    a substrate,
       an input and an output carried by the substrate;
       a conductive transmission line carried by the substrate between the input and output, and
       at least one delay feature coupled to the conductive transmission line; and
    a coupler connected to the RF dispersive delay filter and the RF receiver to subtract the RF interference signal component from the RF input signal thereby producing the signal of interest component.

11. The interference cancellation system of claim 10 wherein the RF dispersive delay filter comprises:
    a ground plane carried by the substrate; and
    a dielectric layer carried by the ground plane carrying the conductive transmission line and the at least one delay feature.

12. The interference cancellation system of claim 10 wherein the at least one delay feature comprises a plurality of delay features coupled to the conductive transmission line on opposing sides thereof.

13. The interference cancellation system of claim 10 wherein the at least one delay feature has a loop shape.

14. The interference cancellation system of claim 10 wherein the RF dispersive delay filter comprises a plurality of conductive through-vias on opposing sides of the conductive transmission line.

15. A radio frequency (RF) dispersive delay filter for an interference cancellation system comprising a radio frequency (RF) transmitter configured to generate an RF interference signal, an RF receiver configured to receive an RF input signal comprising a signal of interest component and an RF interference signal component from the RF transmitter, an electro-optical (EO) modulator configured to apply an interference cancellation phase shift to the RF interference signal, an optical-to-electrical (OE) converter, an optical path between the EO modulator and OE converter, and a coupler connected to the RF dispersive delay filter and the RF receiver to subtract the RF interference signal component from the RF input signal thereby producing the signal of interest component, the RF dispersive delay filter coupled to the OE converter, the RF dispersive delay filter comprising:

a substrate;

an input carried by the substrate and to be connected to the OE converter;

an output carried by the substrate and to be connected to the coupler;

a conductive transmission line carried by the substrate between the input and output; and at least one delay feature coupled to the conductive transmission line.

16. The RF dispersive delay filter of claim 15 comprising:

a ground plane carried by the substrate; and a dielectric layer carried by the ground plane carrying the conductive transmission line and the at least one delay feature.

17. The RF dispersive delay filter of claim 15 wherein the at least one delay feature comprises a plurality of delay features coupled to the conductive transmission line on opposing sides thereof.

18. The RF dispersive delay filter of claim 15 comprising a plurality of conductive through-vias on opposing sides of the conductive transmission line.

19. A method of interference cancellation comprising:

operating a radio frequency (RF) transmitter to generate an RF interference signal;

receiving, using an RF receiver, an RF input signal comprising a signal of interest component and an RF interference signal component from the RF transmitter;

applying, using an electro-optical (EO) modulator, an interference cancellation phase shift to the RF interference signal;

operating an optical-to-electrical (OE) converter;

operating an RF dispersive delay filter connected to the OE converter; and operating a coupler connected to the RF dispersive delay filter and the RF receiver to subtract the RF interference signal component from the RF input signal thereby producing the signal of interest component.

20. The method of claim 19 wherein the RF dispersive delay filter comprises:

a substrate;

an input and an output carried by the substrate;

a conductive transmission line carried by the substrate between the input and output; and at least one delay feature coupled to the conductive transmission line.

21. The method of claim 20 comprising operating a controllable time delay unit coupled along an optical path between the EO modulator and OE converter.

22. The method of claim 20 further comprising operating a controllable gain unit coupled along an optical path between the EO modulator and OE converter.

* * * * *